United States Patent [19]

O'Brien

[11] Patent Number: 4,621,311

[45] Date of Patent: Nov. 4, 1986

[54] HIGH-SPEED SWITCHING REGULATOR

[75] Inventor: Richard A. O'Brien, Newton, Mass.

[73] Assignee: Stevens-Arnold, Inc., Boston, Mass.

[21] Appl. No.: 698,799

[22] Filed: Feb. 6, 1985

[51] Int. Cl.[4] ............................................. H02M 3/335
[52] U.S. Cl. .......................................... 363/21; 363/97
[58] Field of Search ...................... 363/20, 21, 97, 131, 363/55-56

[56] References Cited

U.S. PATENT DOCUMENTS

4,499,532  2/1985  Hudson et al. .......................... 363/21
4,504,898  3/1985  Pilukaitis et al. .................... 363/21 X
4,511,763  4/1985  Skidanenko et al. ............... 363/21 X Primary Examiner—Peter S. Wong
Attorney, Agent, or Firm—Wolf, Greenfield & Sacks

[57] ABSTRACT

A pulse-width modulation, switching DC-to-DC convertor uses positive feedback to combine the conventional comparator and state latch functions. The combined comparator/latch circuit reduces propagation delays through the circuitry and allows operation at higher frequencies. In place of the conventional serially-connected comparator, latch and output transistor, a high-speed comparator is modified by using positive feedback to convert it into a latching comparator. The duty cycle of the output transistor is controlled by the logical combination of the output of an internal oscillator and the output of the latching comparator. The latching comparator is controlled by an error signal and a signal representative of the current running through the output transistor thereby eliminating the usual ramp generation circuitry.

14 Claims, 5 Drawing Figures

HIGH-SPEED SWITCHING REGULATOR

FIELD OF THE INVENTION

This invention relates to power supplies and, in particular, to pulse-width modulated switching power supplies.

BACKGROUND OF THE INVENTION

Much present day electronic equipment requires carefully regulated power including currents and voltages which must be controlled within a high degree of accuracy to specific values. More particularly, modern high-speed electronic equipment is sensitive to relatively short transients or interruptions in power. Consequently, power supplies for such equipment must be able to respond quickly to transients in order to maintain proper regulation and avoid equipment damage. In order to supply regulated power to sensitive electronic equipment several different types of power supplies are now in current use.

One common type of power supply is a analog or series regulator in which an analog control element is inserted between an unregulated source of power and the equipment utilizing the power. Such a regulator is capable of supplying an accurate and stable power supply providing that the analog element can respond sufficiently fast to intercept transient conditions. A drawback of the analog supply is that a large amount of power is dissipated in the analog control element which results in a bulky and expensive assembly.

Another type of regulated power supply which is more efficient is called a "switching regulator". In such a power supply, the output or regulated voltage is controlled by intermittently and periodically connecting the unregulated voltage source through a filter circuit to the utilization equipment (by pulsing the input voltage). The output voltage is regulated by varying the time duration (modulating the width of the input pulse) during which the unregulated voltage is connected to the equipment.

A similar switching or pulse-width modulation arrangement is often used in DC-to-AC and DC-to-DC converters. In this type of circuit, the pulse width modulation circuit periodically connects the unregulated supply to a transformer which then transforms the pulse modulated input waveform to a desired voltage. The transformer output is then filtered to provide the final output voltage.

In order to provide good response time and small size with a switching power supply, it is necessary to operate the supply at a high frequency. However, in prior art circuits, the switching frequency has been limited by the conventional circuit arrangement. In particular, a switching power supply has five main components. The first component is an output transistor (or transistors) which connects the unregulated supply to the utilization device. The switching transistor is, in turn, controlled by another component, a latch circuit, which determines whether the transistor is "on" or "off" depending on whether the latch is "set" or "reset".

The latch is periodically set by an astable or free-running oscillator circuit which determines the frequency at which the supply operates. In order to control the width of the input pulse, the latch is reset after a time duration (thereby turning "off" the output transistor) by a comparator circuit (the fourth component).

The comparator compares an error signal which is derived from the output voltage to a ramp signal generated by the last component, a ramp generator. The ramp generator is triggered by the oscillator and develops an output signal which is a linearly increased voltage ramp. When the error voltage equals the ramp voltage, the comparator resets the latch and turns "off" the output transistor.

In accordance with the above circuitry, the latch (and subsequently the output transistor) is periodically set by the oscillator. The latch remains set for a period of time determined by the length of time taken by the ramp voltage to rise to the error voltage. If the output voltage decreases an error circuit increases the error voltage, thus causing the output transistor to remain "on" for a longer time. By varying the width of the pulses delivered to the utilization device, the circuit regulates the output voltage.

One problem with operating such a circuit at a high switching frequency is that several of the main elements are connected in series. In particular, the comparator is connected to the latch which is, in turn, connected to the output transistor. Each of these series-connected elements delays signals passing through it. Since the propagation delays add, the total delay can be sufficient to cause errors in performance of the circuit. Heretofore it has been possible to increase the switching frequency of such a circuit only by decreasing the propagation delays of the components. However, very high-speed components are expensive and consume more power than their slower counterparts.

It is accordingly an object of the present invention to provide a switching regulator which can be operated at higher frequencies than conventional regulators.

It is another object of the present invention to provide a switching regulator in which the series connection of the control elements is eliminated.

It is still another object of the present invention to increase the switching frequency of a switching regulator while utilizing presently available components.

It is a further object of the present invention to provide a switching regulator which does not use specialized components but can be built with standard readily available electronic circuits.

It is yet a further object of the present invention to provide a switching regulator which simplifies the circuitry by eliminating some of the prior art components.

SUMMARY OF THE INVENTION

The foregoing problems are solved and the foregoing objects are achieved in one illustrative embodiment of the invention in which the usual series connection of the comparator and latch is replaced by a latching comparator. In particular, the functions of the comparator and the latch are combined by using positive feedback to latch the comparator into one of its states. The output of the latching comparator is ANDed with the oscillator and used to drive the output transistor. This connection reduces the propagation delays that are normally present in the serial connection and allows higher frequency operation with conventional components.

Instead of the normal ramp generator, the latching comparator receives a signal which is representative of the current passing through the output transistor. This latter current increases in a substantially linear fashion due to the output filter inductance. The comparator compares this latter signal to an error signal derived from the output voltage. When the two signals are equal, the comparator switches states, turning "off" the output transistor. The comparator is then latched into its new state by positive feedback. Subsequently, the comparator is unlatched by means of a pulse which is generated by the oscillator at the end of the switching cycle.

Since the output transistor is controlled both by the output of the oscillator and the output of the latching comparator connected in parallel, the propagation delay is very short.

DETAILED DESCRIPTION OF THE PREFERRED EMBODIMENT

Figure 1:
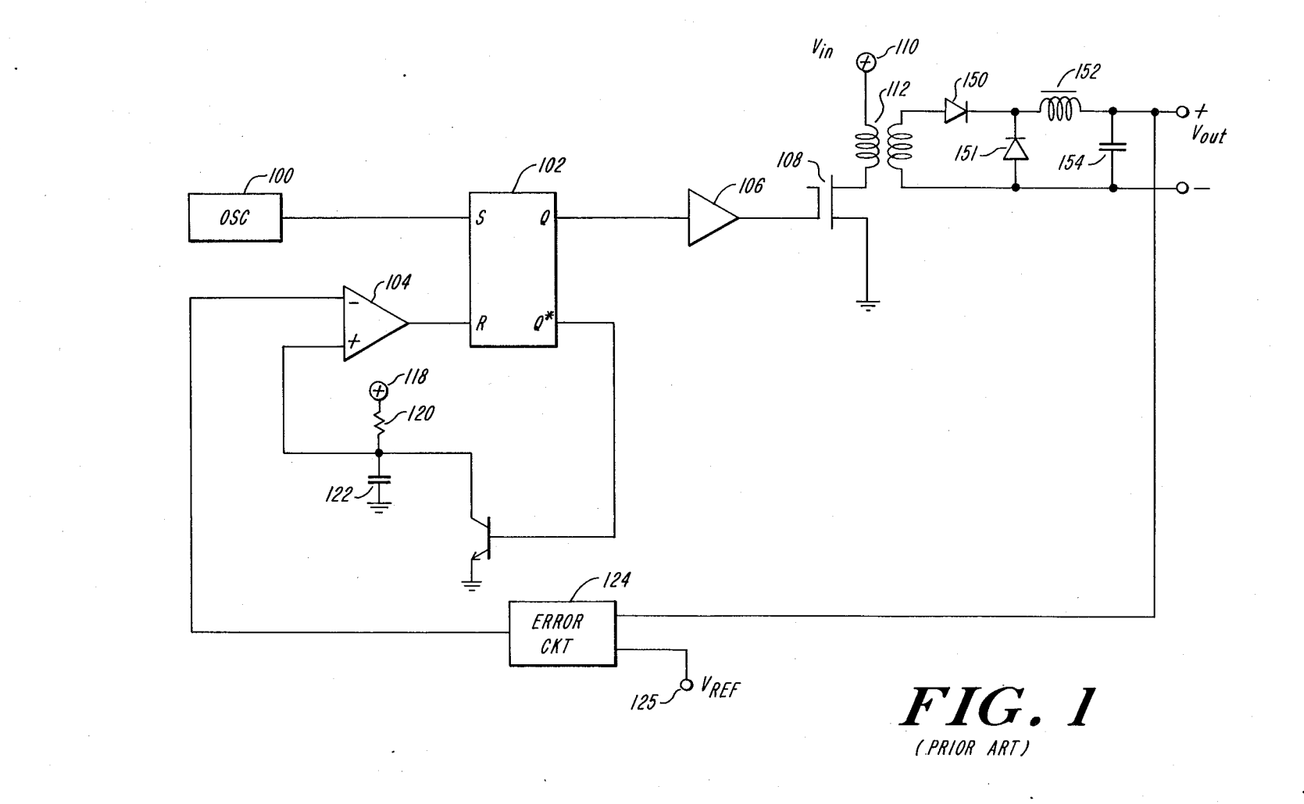
FIG. 1 shows a conventional prior art switching regulator circuit.

A conventional switching regulator can be arranged in a number of configurations, for example, a DC-to-DC convertor as shown in FIG. 1. This well-known circuit converts power from unregulated D.C. source $V_{in}$ (shown schematically in FIG. 1 as voltage source 110) into a regulated D.C. output voltage $V_{out}$. The conversion is performed by periodically interrupting the unregulated D.C. power source to generate an A.C. waveform and then using transformer 112 to perform the a voltage conversion. The output voltage $V_{out}$ is regulated by pulse-width modulating the A.C. waveform which is applied to the primary of transformer 112.

The pulse-width modulation or switching regulator circuit shown in FIG. 1 consists of five main parts: oscillator, latch 102, output transistor 108, comparator 104 and capacitor 122.

Oscillator 100 is of the astable type and provides a periodic train of pulses, each of which initiates a cycle in the operation of the switching regulation circuitry. In particular, operation of the circuitry starts when a pulse from oscillator 100 sets latch 102.

Latch 102, in turn, controls output transistor 108 by means of buffer circuit 106 and, when latch 102 has been set, transistor 108 turns "on", allowing current to flow from source 110 through the primary winding of transformer 112 to ground. As the current flow increases in the primary winding of transformer 112, a voltage is developed across the secondary winding which voltage is rectified by diodes 150 and 151 and filtered by a low-pass filter (consisting of inductor 152 and capacitor 154) to produce the regulated output voltage $V_{out}$.

The "on" time of latch 102 is regulated by comparator 104. Comparator 104 receives, at its negative input, the output of error circuit 124 which output is inversely proportional to the difference of output voltage $V_{out}$ and a reference voltage $V_{ref}$ from reference source 125. The output of error 124 is used as a feedback signal to control the pulse width developed by the regulator circuitry.

In particular, the output of circuit 124 is compared to a ramp signal generated by resistor 120 and capacitor 122. At the start of a switching cycle, capacitor 122 charges from voltage source 118, via resistor 120, producing an increasing ramp waveform which is applied to the positive input of comparator 104. When the voltage of the ramp waveform equals the error voltage generated by circuit 124, comparator 104 generates a "high" signal at its output which "high" signal resets latch 102.

When reset, latch 102 turns "off" transistor 108 via buffer 106 thereby terminating current flow through the primary winding of transformer 112. In addition, a "high" signal appearing at the Q* output of latch 102 is provided to transistor 114 turning it "on". Turned on transistor 114 discharges capacitor 122 so that a new switching cycle can begin.

The regulator controls the output voltage because, as the output voltage $V_{out}$ increases above the reference voltage $V_{ref}$, the output of error circuit 124 decreases and thus, the point in time at which the ramp voltage generated by resistor 120 and capacitor 122 equals the error voltage occurs earlier in the cycle. Therefore, the pulse widths of the pulses delivered by output transistor 108 to transformer 112 are smaller in turn decreasing the average current flow through transformer 112.

Figure 2:
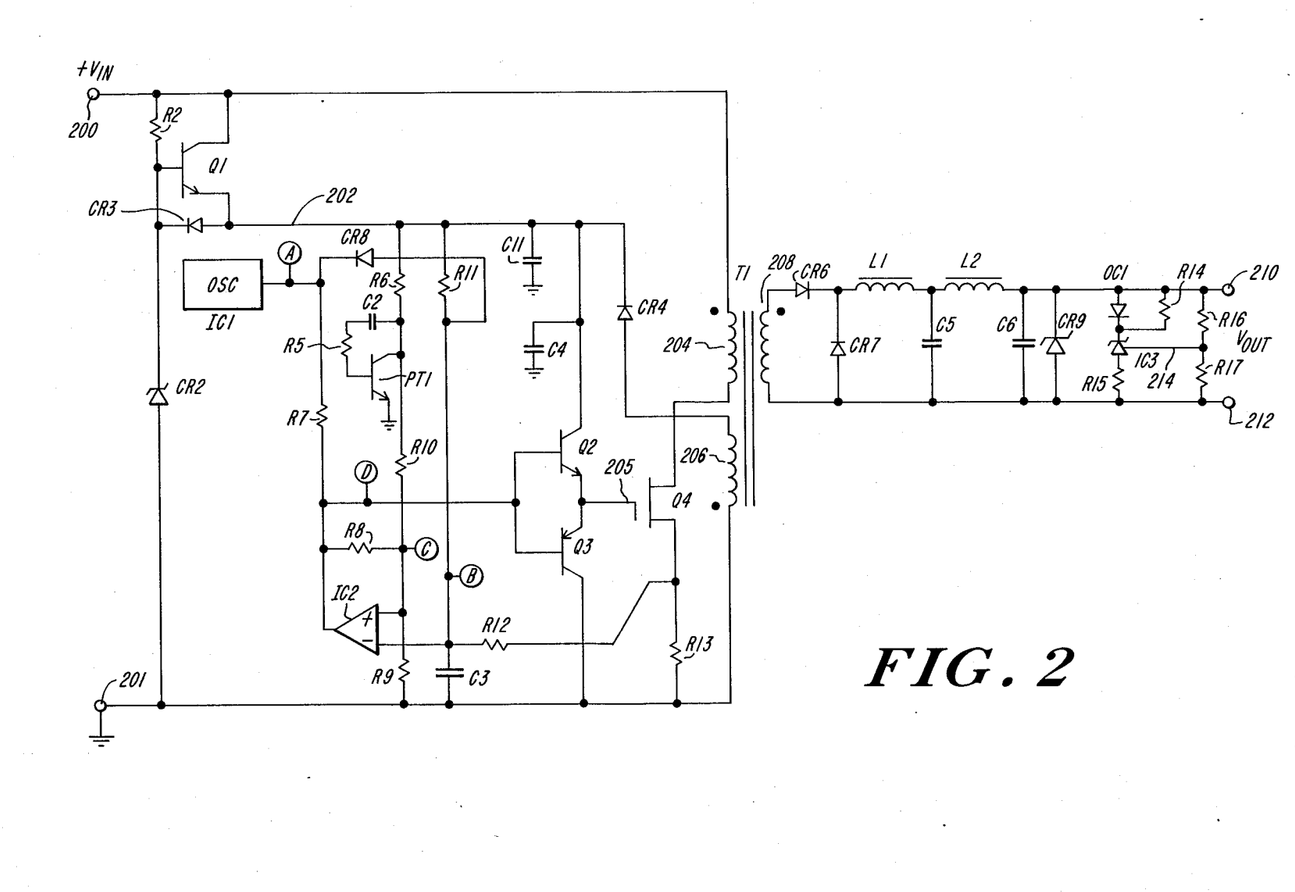
FIG. 2 shows a switching regulator constructed in accordance with the invention.

As shown in FIG. 2, in accordance with one aspect of the invention, the present switching regulator eliminates the series connection of the comparator and latch which limits the high frequency operation of the prior art circuits.

Figure 3:
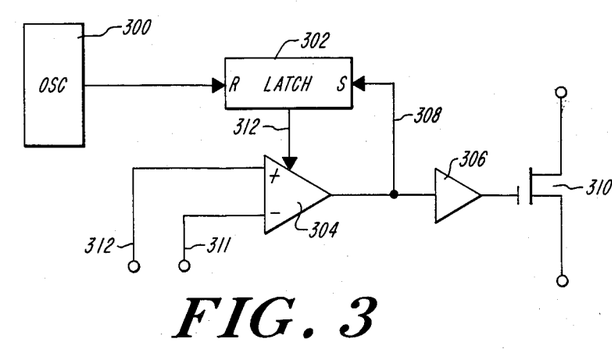
FIG. 3 shows an alternative embodiment of the inventive regulation circuitry.
Figure 3A:
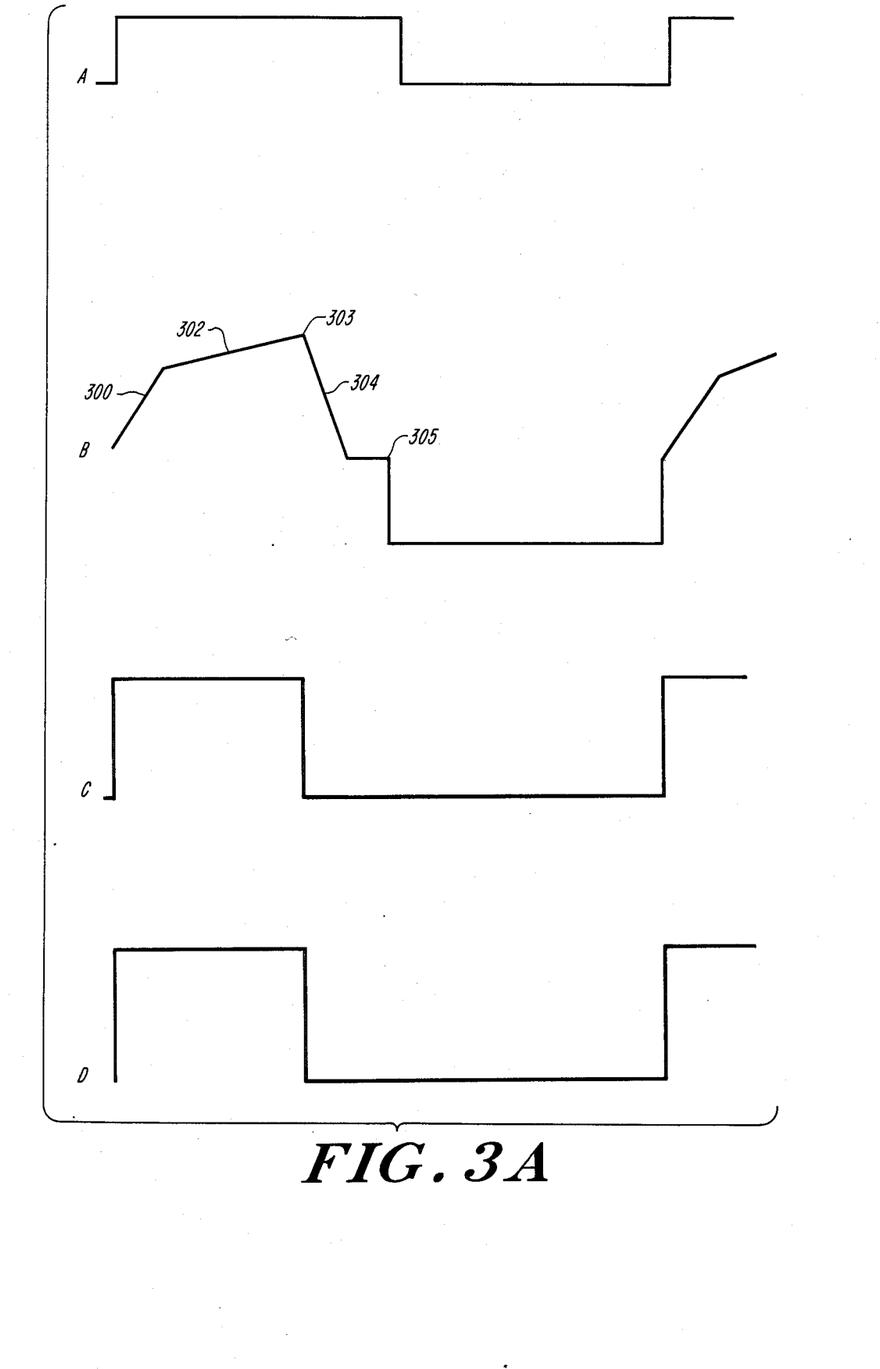
FIG. 3A shows a plurality of electrical waveforms taken at various points in the circuit of FIG. 2.

FIG. 3A shows various voltage waveforms at selected points in the circuit of FIG. 2. In particular, line A of FIG. 3A shows the voltage waveform at the output of oscillator IC1 (as designated by the small "A" enclosed in a circle). Line B shows the voltage at the negative input of comparator IC2. Line C shows the voltage at the positive input of comparator IC2 and line D shows the voltage at the output of comparator IC2.

In particular, the illustrative circuit is a DC-to-DC converter which converts an unregulated input voltage $V_{in}$ appearing at terminals 200 and 201 into a regulated output voltage $V_{out}$ on terminals 210 and 212. The instant invention may also be used with other supplies which include DC-to-AC converters.

The actual voltage conversion between the input voltage $V_{in}$ and the output voltage $V_{out}$ is performed by transformer T1 which is constructed in accordance with conventional principles and has a primary/secondary winding ratio to provide the proper voltage transformation. Primary winding 204 of transformer T1 can be connected across voltage $V_{in}$ by means of a power FET transistor, Q4. Transistor Q4 is, in turn, controlled by driver transistors Q2 and Q3 which are connected in a totem pole driving arrangement to the gate lead 205 of transistor Q4. As will hereinafter be described, transistors Q2 and Q3 are controlled by a logical combination of the outputs of oscillator IC1 and comparator IC2.

The operation of the circuitry is synchronized by oscillator IC1 which is shown in block schematic form in FIG. 2. Oscillator IC1 may be any conventional astable oscillator illustratively comprised of an RC oscillator or, preferably, a integrated circuit oscillator using a 555 integrated circuit. In the illustrative embodiment, the oscillator parameters are set to cause oscillation with a 50% duty cycle square wave output at a fundamental frequency of 200 kilohertz. The oscillator waveform is shown in line A of FIG. 3A.

The output of oscillator IC1 is provided, via resistor R7, to the bases of transistors Q2 and Q3 which, in turn, drive the output FET power transistor Q4. Thus, when the output of oscillator IC1 becomes "high" transistors Q2 and Q3 cause transistor Q4 to turn "on". Turned-on transistor Q4 allows current to flow from the positive terminal 200 of the input voltage source through primary winding 204 and transistor Q4 and resistor R13 to the ground terminal 201.

The current flow through output transistor Q4 is monitored by resistor R13 which is a low-valued resistor (on the order of a fraction of an ohm). A voltage develops across R13 which is proportional to the current flow through the output transistor and this voltage is provided, via resistor R12, to the negative input of comparator IC2. Capacitor C3 is connected between the negative input of comparator IC2 and ground and acts as a noise filter to prevent noise spikes from interfering with the operation of the comparator. Diode CR8 also connects the negative input of comparator IC2 to the output of oscillator IC1.

Comparator IC2 is a conventional device which has an "open-collector" output. That is, the output can be pulled "low" actively by the device, but is not pulled "high" actively and an external voltage source must be used to pull the output "high". Comparator IC2 receives, on its positive input, an error voltage which is determined by a voltage divider consisting of resistors R6, R10 and R9 and the impedance of phototransistor PT1 which is connected between the junction of resistors R6 and R10 and ground. As will hereinafter be explained, the impedance to ground of device PT1 is derived from the output voltage, $V_{out}$, and, thus, the signal provided to the positive input of comparator IC2 is a feedback signal which is inversely proportional to the output voltage. The output of comparator IC2 is connected directly to the bases of driver transistors Q2 and Q3.

The connection of oscillator IC1 and comparator IC2 to the bases of driving transistors Q2 and Q3 effectively "AND"s the two output signals which drive the output transistor Q4 directly. Thus, in accordance with one aspect of the invention, there is no intervening latch circuitry which introduces an additional propagation delay.

Operation of the circuitry begins when oscillator IC1 becomes "high" (line A of FIG. 3A at time $t_o$). At this time the voltage at the positive input of comparator IC2 (controlled by the resistive divider consisting of resistors R6, R10 and R9) is held at a higher potential than the voltage at the negative input (controlled by the voltage divider consisting of resistors R11, R12 and R13). With these inputs, the output of comparator IC2 is "off" (comparator IC2 has an open-collector output becomes "high" (since comparator IC2 has an "open-collector" output, the output is not pulled "low" by the device). Consequently, when the output of oscillator IC1 becomes "high", a "high" signal (as shown in line D of FIG. 3A) is provided to transistors Q2 and Q3 to turn on the output transistor Q4 as previously described.

However, as current begins increasing through secondary winding 204 and resistor R13, the voltage across resistor R13 also increases. This latter voltage is applied, via resistor R12, to the negative input of comparator IC2. Thus, the potential at the negative input of comparator IC2 begins to increase as shown at area 300 of line B in FIG. 3A. At first, the potential sharply increases due to the charging current of the gate-drain capacitance in output transistor Q4. As shown in area 300 of line B, after the rapid increase has occurred, the potential increases more slowly as shown in region 302 because the current flowing through the primary of transformer T1 is limited by the current flow in output inductors L1 and L2, whose impedance is reflected back through the transformer and appears as an equivalent impedance in the drain circuit of the transistor Q4.

Thus, in accordance with one aspect of the invention, the usual ramp generation circuitry has been eliminated. Since the current running through transistor Q4 is, in effect, limited by the current flow through the filter inductances, the voltage developed across R13 can serve as a ramp signal.

At some point during the cycle, the potential at the negative input of comparator IC2 equals the potential at the positive input. In FIG. 3A, line B, this equality occurs at point 303. As soon as the potential at its negative input exceeds the potential at its positive input, comparator IC2 produces a "low" output (as shown in line D of FIG. 3A). The "low" output is applied to the bases of transistors Q2 and Q3 and, in turn, turns "off" transistor Q4, thereby disconnecting primary winding 204 from the input voltage $V_{in}$.

When transistor Q4 turns "off", the current through the primary winding 204 rapidly decreases and thus the voltage across resistor R13 decreases rapidly until the potential at the negative input of comparator IC2 returns to its quiescent value as shown in region 304 of line B in FIG. 3A.

However, the output of comparator IC2 is held "low" by positive feedback resistor, R8, which is connected from the output of comparator IC2 to its positive input. In particular, when the output of comparator IC2 becomes "low", resistor R8 reduces the potential appearing at the positive input of comparator IC2 to less than the quiescent potential appearing at its negative input. Therefore, the comparator output remains "low" even though as the voltage across resistor R13 decreases to zero, the voltage at the negative terminal of the comparator decreases to its quiescent value. Consequently, output transistor Q4 remains "off".

Shortly thereafter, the output of oscillator IC1 becomes "low" (line A of FIG. 3A). The "low" signal appearing at the output of oscillator IC1 is coupled, via diode CR8, to the negative input of comparator IC2 and reduces the potential applied to the negative input of comparator IC2 to less than the potential applied to the positive input by resistor R8. This change in potential causes comparator IC1 to revert its initial state with a "high" output. However, the output does not actually become "high" at this time because the "low" signal at the output of oscillator IC1 holds the output "low" via resistor R7. Transistor Q4 thus remains "off" (line D, FIG. 3A).

Operation in this manner proceeds until the beginning of the next cycle at which time the output of oscillator IC1 becomes "high", again turning "on" transistor Q4 and initiating a new cycle.

The components of the illustrative pulse-width modulation circuitry, including the oscillator IC1 and comparator IC2 (connections between these devices and line 202 are not shown in FIG. 2 for clarity), are operated from an internal, regulated voltage source provided on lead 202. During initial circuit startup, this internal voltage is generated from the input voltage $V_{in}$ by the voltage regulator consisting resistor R2, Zener diode CR2 and transistor Q1. In particular, the base of transistor Q1 is held at a predetermined reference potential determined by Zener diode CR2 and thus the emitter of transistor Q1 is stabilized at a predetermined potential.

However, after the illustrative circuitry begins operation, it is self-powered by means of additional winding on transformer T1. More particularly, after the circuit becomes operational, a voltage is developed across additional winding 206 of transformer T1. This voltage is applied, via diode CR4, to internal supply lead 202 to power the circuitry. The voltage on supply lead 202 is connected, via diode CR3, to Zener diode CR2 and is thus regulated by diode CR2.

The secondary winding of transformer T1 produces the output voltage. This voltage is rectified by diodes CR7 and CR8 and filtered by a conventional filter circuitry consisting of inductors L1 and L2 and capacitors C5 and C6. A Zener diode, CR9, connected across the output circuitry prevents an overvoltage condition from damaging the circuitry.

The feedback circuit which is used to control the pulse width of the switching circuitry consists of optical coupler diode OC1, resistor R14, integrated circuit IC3 and resistors R15, R16 and R17. Integrated circuit IC3 is a well-known device known as a voltage-controlled Zener diode. It establishes a fixed potential between its anode and cathode which potential is determined by the potential between its cathode and control lead 214. The control lead 214 is connected to a resistive voltage divider consisting of resistors R16 and R17 which are, in turn, connected across the output voltage terminals 210 and 212. In operation, if the voltage appearing across terminals 210 and 212 increases, the current running through IC3 will also increase. Resistor R14 is connected between terminal 210 and the cathode of circuit IC3 to provide a quiescent current through the device to keep it operational.

A portion of the current passing through circuit IC3 also passes through optical coupler diode, OC1. Thus as the output voltage increases, the current running through device IC3 increases, in turn, causing the optical coupler diode to increase its brightness. Resistor R15 is connected in series with circuit IC3 to limit the current therethrough to prevent damage to diode IC3.

The light from optical coupler diode OC1 interacts with phototransistor PT1 in the pulse-width modulating circuit. As the output of optical coupler diode OC1 increases, phototransistor PT1 will become more conductive. Since phototransistor PT1 shunts voltage divider resistors R10 and R9 as it becomes more conductive, it reduces the potential applied to the positive input of circuit RC2. A reduced potential at the positive input of comparator of IC2, in turn, reduces the time duration of the pulse applied to the output transistor Q4 which reduces the output voltage.

Phototransistor PT1 has a compensation network consisting of resistor R5 and capacitor C2 connected between its base and collector. These components change the frequency response of the circuitry.

Component values suitable for use with the illustrative circuitry (as shown in FIG. 2) are given in Tables I and II. These values are illustrative only and are not intended as a limitation upon the claims of the invention.

TABLE I

| Component | Value |
|---|---|
| R2 | 33K |
| R3 | 10K |
| R4 | 13K |

TABLE I-continued

| Component | Value |
|---|---|
| R5 | 100K |
| R6 | 10K |
| R7 | 2.2K |
| R8 | 47K |
| R9 | 2.87K |
| R10 | 10K |
| R11 | 10K |
| R12 | 1.5K |
| R13 | 0.33 Ohms |
| R14 | 680 Ohms |
| R15 | 24 Ohms |
| R16 | 1.82K |
| R17 | 1.82K |
| C3 | 100 picofarad |
| C4 | 0.1 Microfarad |
| C5 | 100 Microfarad |
| C6 | 47 Microfarad |
| C11 | 1 Microfarad |

TABLE 2

| Device | Device Type |
|---|---|
| Q1 | MPS-A06 |
| Q2 | 214401 |
| Q3 | 214403 |
| Q4 | |
| CR2 | 1N5242B |
| CR3 | 1N4448 |
| CR4 | 1N4448 |
| CR5 | 1N4448 |
| CR6 and CR7 | C82-004 (Fuji) |
| CR8 | 1N4448 |
| CR9 | |
| IC1 | TLC555CP |
| IC2 | LM311P |
| IC3 | TL431C |

Figure 4:
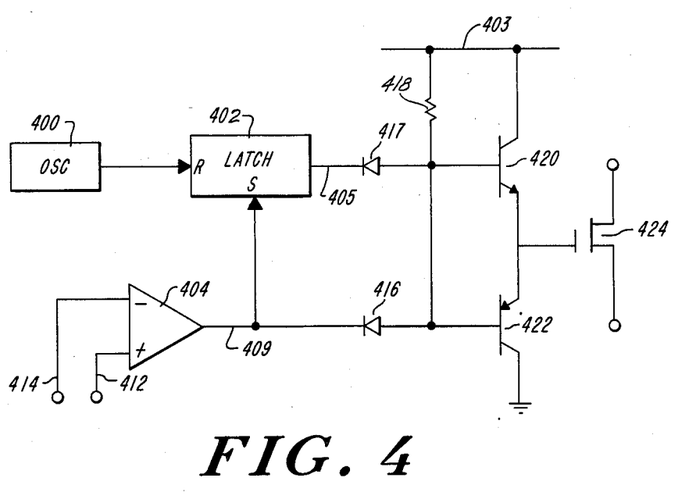
FIG. 4 shows an additional embodiment of the inventive regulation circuitry.

FIGS. 3 and 4 show additional embodiments of the inventive switching regulator circuitry in which the latching function of the latching comparator IC2 in FIG. 2 is accomplished by using alternative circuitry.

In particular, in the embodiment shown in FIG. 3, the latching function is accomplished by comparator 304 and external latch 302. The output of latch 302, on lead 312, is connected internally to comparator 304 causing it to latch into one of its two states. Such an implementation is advantageous if the regulator circuitry is to be integrated on a single chip and the internal connections of comparator 304 can be accessed.

The circuitry in FIG. 3 operates in a similar manner to the circuitry shown in FIG. 2. In particular, output transistor 310 corresponds to output transistor Q4 in FIG. 2. Transistor 310 is, in turn, driven by buffer circuit 306 which is controlled by the output of comparator 304. Comparator 304 receives on its negative input, via terminal 311, a ramp signal which may be generated by a resistor in series with output transistor 310 in a manner similar to that shown in FIG. 2. The positive input of comparator 304 is connected, via terminal 312, to a signal which depends on the error between the desired output voltage and the actual output voltage.

A typical cycle of operation starts with latch 302 in a reset state. The output of comparator 304 is "high" due to the fact that the ramp voltage on input lead 311 is lower than the error voltage on terminal 312. The "high" output of comparator 304 is applied to buffer 306 causing it to turn on output transistor 310.

When the ramp voltage on terminal 312 increases to a point at which it is equal to the error voltage on terminal 311, the output of comparator 304 becomes "low", in turn, turning "off" transistor 310 via buffer 306. The "low" signal at the output of comparator 304 is provided, via lead 308, to the set input of latch 302. The "low" signal causes latch 302 to become set which, in turn, via lead 312, controls the internal state of comparator 304 to latch it and hold the comparator output "low". At the end of the cycle, oscillator 300 provides a "low" signal to the reset input of latch 302 resetting the latch and allowing the comparator to return to its orignal condition in which its output is "high". The operation of the circuitry repeats in this manner.

Another embodiment which also eliminates the prior art series connection of comparator and latch is shown in FIG. 4. In this embodiment, output transistor 424 is controlled by a buffer circuit comprising transistors 420 and 422. The buffer circuit is, in turn, controlled by comparator 404 and latch 402 which are connected in an "OR" configuration. Comparator 404 receives, at its negative input, a ramp signal, which may be generated, as illustrated in FIG. 1, by a resistor-capacitor network, or by a current sensing network as shown in FIG. 2 (resistors R12 and R13 with capacitor C3). The positive input of comparator 404 is connected, via terminal 412, to an error signal.

Operation of the circuit starts when latch 402 is reset by oscillator 400, permitting output 405 of latch 402 to be pulled "high" (to the value of supply voltage 403) by diode 417 and resistor 418. This action results in application of voltage to the gate lead of output transistor 424 by buffer transistor 420, causing it to turn "on" and start current flowing in the output transformer (not shown).

When the voltage level of the ramp signal appearing at the negative terminal 414 of comparator 404 exceeds the voltage at the positive input 412, the output of comparator 404 on lead 409, becomes "low". This "low" signal causes buffer transistor 420 to turn "off" and buffer transistor 422 to turn "on", resulting in turn "off" of output transistor 424, and termination of current flow in the output transformer. The "low" signal at 409 simultaneously "sets" the output of latch 402 to its "low" state.

When output transistor 424 turns "off", the signal value at the negative input 414 of comparator 404 will fall below the signal level at positive input 412, causing the output 409 of comparator 404 to revert to a "high" state. However, output transistor 424 is maintained in its "off" state by latch 402 and diode 417. The cycle will then repeat when oscillator 400 causes latch 402 to "reset".

The three embodiments of the illustrative circuitry as shown are functional equivalents. In these embodiments, the prior art series connection of comparator and latch is eliminated and the "latching" function is provided either in the comparator itself or in the transistor driver circuitry. The comparator output drives the output transistor either directly or by means of a logical combination of the comparator output and other signals.

What is claimed is:

1. A switching regulator for conditioning an input voltage to provide a regulated output voltage to utilization apparatus, comprising
    timing means for generating a periodic timing waveform,
    means responsive to said output voltage for generating an error signal indicating a difference between said output voltage and a desired output voltage,
    means for generating a reference signal,
    comparator means responsive to said error signal and said reference signal for generating an output signal when said error signal is equal to said reference signal,
    means for latching said comparator means into one of its states,
    means responsive to the output of said timing means for changing said comparator means to the other of its states, and
    switching means responsive directly to a logical combination of the output of said comparator means and the output of said timing means for temporarily connecting said input voltage to said utilization apparatus.

2. A switching regulator according to claim 1 wherein said reference signal providing means comprises means responsive to the current flowing through said switching means.

3. A switching regulator according to claim 1 wherein said logical combination is a logical AND combination.

4. A switching regulator for conditioning an input voltage to provide a regulated output voltage to utilization apparatus, comprising,
    timing means for generating a periodic timing waveform,
    means responsive to said output voltage for generating an error signal indicating a difference between said output voltage and a desired output voltage,
    means for generating a reference signal,
    comparator means responsive to said error signal and said reference signal for generating an output signal when in one of its two internal states, said comparator means changing internal states when said error signal exceeds said reference signal,
    latching means having two internal states, said latching means being responsive to said comparator output signal at a set input for latching into one of its internal states, and being responsive to said periodic timing waveform at a reset input for latching into the other of its internal states, said latching means generating a latch output signal when in said one internal state for latching said comparator into one of its internal states, and
    switching means responsive to said comparator output signal for temporarily connecting said input voltage to said utilization apparatus.

5. A switching regulator according to claim 4 wherein said reference signal providing means comprises means responsive to the current flowing through said switching means.

6. A switching regulator for conditioning an input voltage to provide a regulated output voltage to utilization apparatus, comprising
    an oscillator for generating a periodic timing waveform,
    a comparator having two inputs and two internal states,
    an output transistor responsive to a logical combination of the output of said oscillator and the output of said comparator for temporarily connecting said input voltage to said utilization apparatus,
    means responsive to said output voltage for providing an error signal to one of said comparator inputs,
    ramp voltage generation circuitry for providing a reference signal to the other of said comparator inputs, means for latching said comparator into one on its states, and means responsive to the output of said oscillator for changing the state of said comparator after it has been latched into one of its states.

7. A switching regulator according to claim 6 wherein said logical combination is an AND combination.

8. A switching regulator according to claim 6 wherein said logical combination is an OR combination.

9. A switching regulator according to claim 6 wherein said reference signal providing means comprises means responsive to the current flowing through said switching means.

10. A switching regulator for conditioning an input voltage to provide a regulated output voltage to utilization apparatus, comprising an oscillator for generating a periodic timing waveform, a comparator having an output, a positive input, a negative input and two internal states, said comparator changing states depending on the relative difference between voltages at its positive input and its negative input, an output transistor responsive to the logical AND combination of the output of said oscillator and the output of said comparator for temporarily connecting said input voltage to said utilization apparatus, means responsive to said output voltage for providing an error signal to said positive comparator input, means responsive to the current flowing through said switching means for providing a reference signal to said negative comparator input, bias means connected to said comparator positive input and said comparator negative input for biasing said inputs so that the quiescent potential on said positive input exceeds the quiescent potential on said negative input, means for latching said comparator into one of its states when said error signal exceeds said reference signal, and means for changing thr state of said comparator after it has been latched into one of its states.

11. A switching regulator according to claim 10 wherein said error signal providing means comprises an optical coupler having a photodiode connected to said output voltage and a phototransistor connected to said bias means.

12. A swtiching regulator for conditioning an input voltage to provide a regulated output voltage to utilization apparatus, comprising timing means for generating a periodic timing waveform, means responsive to said output voltage for generating an error signal indicating a difference between said output voltage and a desired output voltage, means for generating a reference signal, comparator means responsive to said error signal and said reference signal for generating an output signal when in one of its two internal states, said comparator means changing internal states when said error signal exceeds said reference signal, latching means having two internal states, said latching means being responsive to the output of said comparator at a set input for latching into one of its internal states, and being responsive to said periodic timing waveform at a reset input for latching into the other of its internal states said latching means generating a latch output signal when in said one internal state, and switching means responsive to the logical combination of said latch output signal and said comparator output signal for temporarily connecting said input voltage to said utilization apparatus.

13. A switching regulator according to claim 12 said reference signal providing means comprises means responsive to the current flowing through said switching means.

14. A switching regulator according to claim 12 said logical combination is an "OR" function.

* * * * *